No. 777,719. PATENTED DEC. 20, 1904.
G. R. FENNER & F. W. TRASH.
PNEUMATIC TIRE FOR VEHICLE WHEELS.
APPLICATION FILED JAN. 25, 1904.
NO MODEL. 2 SHEETS—SHEET 1.
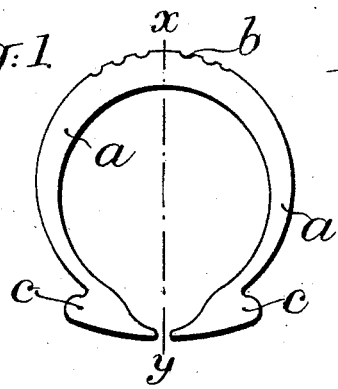
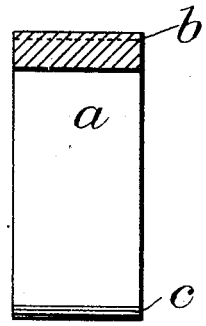
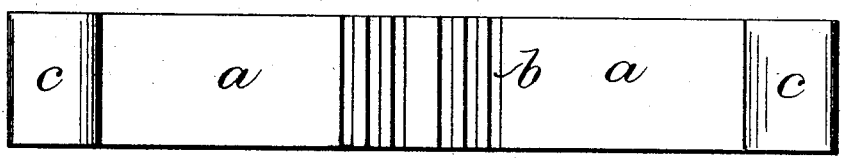
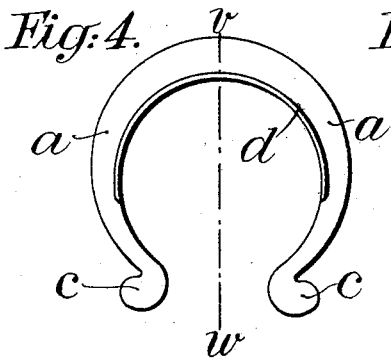
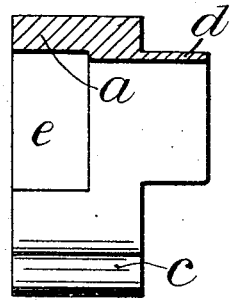
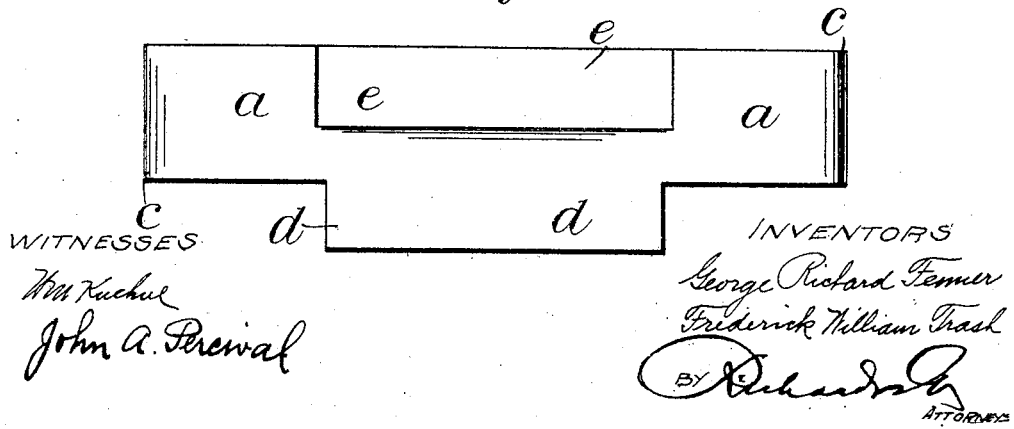
WITNESSES
Wm Kuchue
John A. Percival
INVENTORS
George Richard Fenner
Frederick William Trash
BY Richardson
ATTORNEY

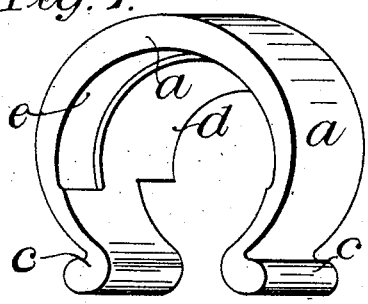
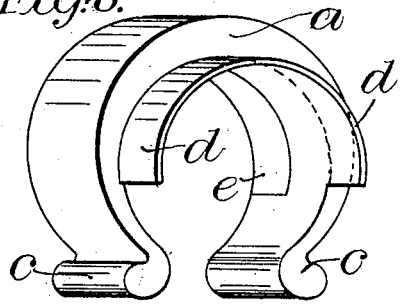
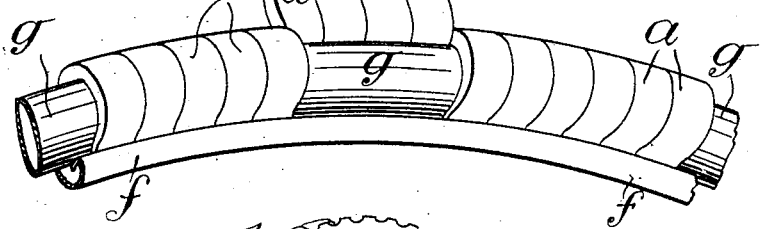
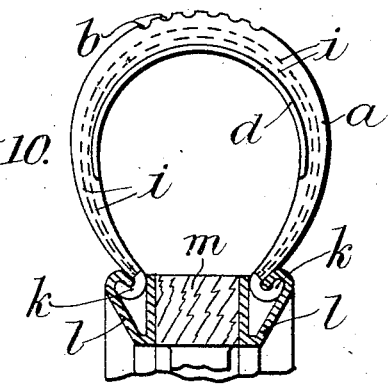
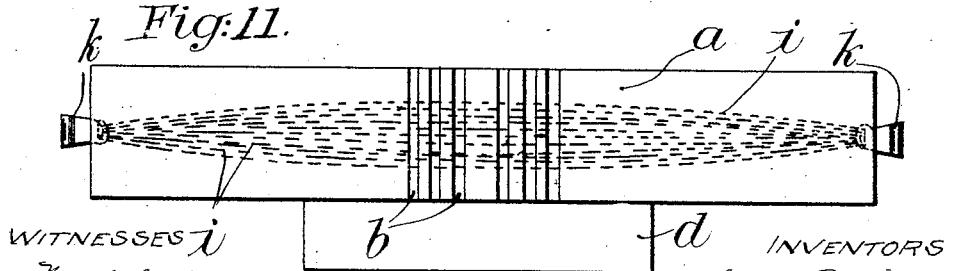

No. 777,719.                                                                 Patented December 20, 1904.

UNITED STATES PATENT OFFICE.

GEORGE RICHARD FENNER AND FREDERICK WM. TRASH, OF LONDON, ENGLAND.

PNEUMATIC TIRE FOR VEHICLE-WHEELS.

SPECIFICATION forming part of Letters Patent No. 777,719, dated December 20, 1904.

Application filed January 25, 1904. Serial No. 190,603.

*To all whom it may concern:*

Be it known that we, GEORGE RICHARD FENNER and FREDERICK WILLIAM TRASH, both citizens of the United Kingdom of Great Britain and Ireland, and residents of London, England, have invented certain new and useful Improvements in and Connected with Pneumatic Tires for the Wheels of Motor-Cars, Cycles, Road-Vehicles, and the Like, of which the following is a specification, such as will enable others skilled in the art to which it appertains to make and use the same.

The present invention refers to improvements in and connected with pneumatic tires for the wheels of motor-cars, cycles, road-vehicles, and the like, and is designed to afford greater resiliency than obtained from tires now in use, also greater facilities for repairing or replacing worn parts, thereby lengthening the life of the tire, as well as adding to the comfort derived from its use. We obtain this result by forming the outer cover of the tire in segments of any suitable width attached to or fitted onto the rims or fellies of the wheels in any suitable manner. These segments are made of india-rubber or other suitable resilient materials. The usual air or inner tubes are used with our tires, and the said tubes can be strengthened by longitudinal strips or bands of canvas or other suitable material. The segments of the outer cover can be formed with flanges of canvas, india-rubber, or other suitable material to prevent stones, grit, or the like from working in between the segments, and so into the inner tube.

We will now describe our invention, with reference to the accompanying drawings, in which—

Figure 1 shows an elevation of a simple form of segment. Fig. 2 is a section of Fig. 1 on the line $x\,y$. Fig. 3 shows a plan view of a segment, as in Fig. 1, when spread out flat. Fig. 4 shows in elevation another form of segment having a flange. Fig. 5 is a section of Fig. 4 on line $v\,w$ and shows in addition to the flange a recess made in the segment for the flange of the adjoining segment to fit into. Fig. 6 shows a plan view of the segment shown in Fig. 4 when spread out flat as seen from the inside. Figs. 7 and 8 are perspective views of flanged and recessed segments as seen from each side. Fig. 9 shows in perspective part of a tire composed of a number of segments $a\,a$, fitted to rim $f$. Four of these segments are shown with one of their edges or ends removed from the rim and turned or bent back, giving access to the air-tube $g$. Fig. 10 shows an end view of a segment fitted to a wood felly, shown in section, having side rims or channels with which hooks on the segment engage and hold the segment in place when stretched by the air-tube, not shown. Fig. 11 is a plan view of the segment shown in Fig. 10.

Referring to Figs. 1 and 3, $a$ is the segment, with usual tread $b$ and beaded or enlarged edges $c$.

In Figs. 4 to 8, $a$ shows the segment with enlarged edges $c$. $d$ is a flange formed on or attached to the segment $a$, and $e$ is a recess in the segment for the flange of adjoining or next segment.

In Fig. 9, $a\,a$ are segments fitted to rim $f$ and over air-tube $g$.

In Figs. 10 and 11, $a$ is the segment with flange $d$. $i$ is a fabric insertion molded in the segment $a$, to the ends of which insertion metal hooks $k$ are attached and serve to grip onto the rims $l\,l$ on the wood felly $m$.

It must be understood that the drawings show only a few of many forms or shapes which our invention may take. We may shape the segments in many forms and fit them together and to the rims or fellies in any convenient manner. The segment may be provided with hooks, studs, or other suitable fastenings for holding them in place and may be furnished with any suitable device for the prevention of skidding or side slip.

What we claim, and desire to secure by Letters Patent, is—

A cover for pneumatic tires, said cover being made up of segments having recesses therein, means for securing the segments to the rim of the wheel and flanges on the segments, the flange of each segment entering the recess of the adjacent segment, substantially as described.

In witness whereof we have hereunto set our hands in presence of two witnesses.

GEORGE RICHARD FENNER
FREDK. WM. TRASH.

Witnesses:
  HY. FAIRBROTHER,
  C. B. CROMPTON.